United States Patent
Fang et al.

(10) Patent No.: US 11,450,017 B1
(45) Date of Patent: Sep. 20, 2022

(54) METHOD AND APPARATUS FOR INTELLIGENT LIGHT FIELD 3D PERCEPTION WITH OPTOELECTRONIC COMPUTING

(71) Applicant: Tsinghua University, Beijing (CN)

(72) Inventors: Lu Fang, Beijing (CN); Zhihao Xu, Beijing (CN); Xiaoyun Yuan, Beijing (CN); Tiankuang Zhou, Beijing (CN); Qionghai Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/742,821

(22) Filed: May 12, 2022

(30) Foreign Application Priority Data

Nov. 12, 2021 (CN) .......................... 202111340133.X (51) Int. Cl.
  *G06T 7/557* (2017.01)
  *H04N 13/128* (2018.01)
  (Continued)

(52) U.S. Cl.
  CPC .............. *G06T 7/557* (2017.01); *G02B 27/14* (2013.01); *G06N 3/04* (2013.01); *G06T 7/593* (2017.01); *H04N 13/128* (2018.05); *H04N 13/239* (2018.05); *H04N 13/271* (2018.05); *G06T 2207/10012* (2013.01);
  (Continued)

(58) Field of Classification Search
  None
  See application file for complete search history.

(56) References Cited

U.S. PATENT DOCUMENTS

2017/0278289 A1* 9/2017 Marino .................. G06T 11/60
2019/0122378 A1* 4/2019 Aswin ..................... G06T 5/003
(Continued)

FOREIGN PATENT DOCUMENTS

| CN | 110929864 | 3/2020 |
| CN | 111741281 | 10/2020 |

OTHER PUBLICATIONS

Lee et al., "Deep Neural Network for Multi-Depth Hologram Generation and Its Training Strategy," Optics Express, vol. 28, No. 18, abstract only, 2020.
(Continued)

*Primary Examiner* — Tyler W. Sullivan
(74) *Attorney, Agent, or Firm* — Hodgson Russ LLP (57) ABSTRACT

A method for intelligent light field depth classification based on optoelectronic computing includes capturing and identifying binocular images of a scene within a depth range through a pair of binocular cameras; mapping each depth value in the depth range to a disparity value between the binocular images, to obtain a disparity range of the scene within the depth range; labeling training data based on the disparity range to obtain a pre-trained diffraction neural network model; loading a respective weight for each layer of a network obtained after training into a corresponding optical element based on the pre-trained diffraction neural network model; and after the respective weight for each layer of the network is loaded, performing forward propagation inference on new input data of the scene, and outputting a depth classification result corresponding to each pixel in the binocular images of the scene.

10 Claims, 7 Drawing Sheets

(51) Int. Cl.
  *G06N 3/04*    (2006.01)
  *H04N 13/00*   (2018.01)
  *H04N 13/239*  (2018.01)
  *H04N 13/271*  (2018.01)
  *G06T 7/593*   (2017.01)
  *G02B 27/14*   (2006.01)

(52) U.S. Cl.
  CPC .............. *G06T 2207/20081* (2013.01); *G06T 2207/20084* (2013.01); *G06T 2207/20228* (2013.01); *H04N 2013/0081* (2013.01)

(56) References Cited

U.S. PATENT DOCUMENTS

| | | | |
|---|---|---|---|
| 2019/0208181 A1* | 7/2019 | Rowell | H04N 9/8227 |
| 2020/0279387 A1* | 9/2020 | Zhang | G06F 17/18 |
| 2020/0342652 A1* | 10/2020 | Rowell | G06T 7/75 |
| 2021/0142170 A1 | 5/2021 | Ozcan et al. | |
| 2021/0150747 A1* | 5/2021 | Liu | G06N 3/0454 |
| 2022/0164634 A1* | 5/2022 | Dai | G06N 3/067 |

OTHER PUBLICATIONS

Fang et al., "Computational Light Field Imaging," Acta Optica Sinica, vol. 40, No. 1, Jan. 2020.
CNIPA, First Office Action for CN Application No. 202111340133. X, dated Dec. 21, 2021.
CNIPA, Notification to Grant Patent Right for Invention for CN Application No. 202111340133.X, dated Jan. 13, 2022.

\* cited by examiner

METHOD AND APPARATUS FOR INTELLIGENT LIGHT FIELD 3D PERCEPTION WITH OPTOELECTRONIC COMPUTING

CROSS REFERENCE TO RELATED APPLICATION

This application claims priority and benefits to Chinese Application No. 202111340133.X, filed on Nov. 12, 2021, the entire contents of which is incorporated herein by reference.

TECHNICAL FIELD

The disclosure relates to a field of three-dimensional information reconstruction and free-space optoelectronic computing technologies, in particular to a method and device for intelligent depth classification of a light field based on optoelectronic computing.

BACKGROUND

Three-dimensional (3D) vision is a perception pathway for human beings. Among five perception pathways of human beings, vision accounts for 70% to 80% of information sources; while the brain has about 50% of the ability to perceive visual information. The single-lens imaging system (like a single human eye) only supports two-dimensional. However, observing the three-dimensional world through two-dimensional images causes loss of rich information of the real world. To fully represent the light in the three-dimensional world, the concept of light field is proposed. By capturing and displaying the light field, a stereo real word can be visually reproduced. At the state of art, the light field can be captured or imaged by methods of scanning through the image sensor, imaging through the image sensor, or imaging through micro lens array, the essence of which is to achieve multi-view observation of a target object. Human eyes are the simplest light field imaging system from two viewpoints. Based on the triangular ranging principle, two-dimensional observation of the same scene from at least two different viewpoints can obtain enough information to restore and reconstruct the three-dimensional light field.

SUMMARY

In order to achieve the above objectives, embodiments of a first aspect of the disclosure propose a method for intelligent light field depth classification based on optoelectronic computing, including:

capturing and identifying binocular images of a scene within a depth range through a pair of binocular cameras;

mapping each depth value in the depth range to a disparity value between the binocular images based on the depth value and an arrangement manner of the pair of binocular cameras, to obtain a disparity range of the scene within the depth range;

labeling training data based on the disparity range to obtain a pre-trained diffraction neural network model;

loading a respective weight for each layer of a network obtained after training into a corresponding optical element based on the pre-trained diffraction neural network model;

after the respective weight for each layer of the network is loaded, performing forward propagation inference on new input data of the scene, and outputting a depth classification result corresponding to each pixel in the binocular images of the scene;

in which labeling training data based on the disparity range includes: determining that an ideal output of an optoelectronic diffraction neural network is a serial number of a respective disparity range where an object corresponding to each pixel position in a field of view is located, and obtaining an upper disparity limit and a lower disparity limit based on a selected depth range, in which the serial number being −1 indicates that the disparity value of a current pixel is higher than the upper disparity limit, the serial number being 0 indicates that the disparity value of the current pixel is between the upper disparity limit and the lower disparity limit, and the serial number being 1 indicates that the disparity value of the current pixel is lower than the lower disparity limit.

Additional aspects and advantages of the disclosure will be set forth, in part, from the following description, and in part will be apparent from the following description, or may be learned by practice of the disclosure.

BRIEF DESCRIPTION OF THE DRAWINGS

The above and/or additional aspects and advantages of the present invention will become apparent and readily understood from the following description of embodiments taken in conjunction with the accompanying drawings.

DETAILED DESCRIPTION

The following describes in detail embodiments of the disclosure, examples of which are illustrated in accompanying drawings, in which the same or similar reference numerals refer to the same or similar elements or elements having the same or similar functions throughout. The embodiments described below with reference to the accompanying drawings are exemplary, and are intended to explain the disclosure and should not be construed as limiting the disclosure.

After the two-dimensional imaging results (hereinafter referred to as a pair of binocular images) from the above two viewpoints are obtained, the three-dimensional depth information (i.e., a respective distance of a position of an actual scene corresponding to each pixel in the view of field from the observation point) can be obtained by an existing binocular matching algorithm. In the depth computing, the disparity is used to describe the positional difference of the same object between two images (in other words, disparity can describe a relative positional relationship between an object in the field of view and the observation point). Therefore, existing binocular matching algorithms can obtain the disparity distribution between a given pair of binocular images, and the output is called disparity map.

In recent years, deep neural network technology, represented by Pyramid Stereo Matching (PSM), has made great breakthroughs in 3D restoration and reconstruction of light field, which improves the depth accuracy, resolution, integrity, and algorithm robustness. However, the existing neural networks based on silicon-based computing chips have high computing power requirements and low computing energy efficiency, making it difficult to realize real-time computing on unmanned systems. In addition, due to the failure of Moore's Law, the development of silicon-based computing chips is limited in recent years, and the growth of computing power has slowed down, making it difficult to meet the needs of further development of artificial intelligence neural networks in the future.

In view of this problem, a method that uses light to physically implement a neural network structure for computing, such as Diffractive Deep Neural Networks (D2NN), is provided. This method utilizes the diffraction effect of light waves propagating in free space to perform independent amplitude attenuation or phase delay on a field distribution at different spatial locations of the wavefront. This amplitude or phase modulation with spatial distribution difference can be coupled with certain information, such that the carried information can be modulated onto the wavefront, to complete the basic data computing. To achieve the diversity of the computing for different tasks, different devices can be added to the optical path of wavefront propagation to achieve domain transformation, or to efficiently combine multiple wavefront modulation to realize a larger computing scale. On this basis, the development of optical materials also provides the possibility for nonlinear optical computing. After placing such materials with optical nonlinear characteristics on the optical path as a propagation medium, nonlinear components can be introduced into the result of wavefront modulation. As a part of the neural network structure, the nonlinear operation can offer the network with complex function mapping capabilities, such that the network can complete complex fitting tasks. The nonlinear material is applied as activations after the wavefront modulation computing, such that multiple wavefront modulations can be regarded as an optical diffraction neural network structure with neural network characteristics. This structural characteristic provides the possibility for optoelectronic computing to process complex visual tasks.

However, the existing optical computing network or optoelectronic computing network structure is relatively simple, and can only realize primary and simple visual tasks, such as digit classification, object recognition, etc., and it is difficult to realize more complex and advanced visual tasks. The disclosure proposes a new 3D reconstruction technology of a light field through optoelectronic computing based on optical interference. Further, the disclosure provides a modularized optoelectronic neural network prototype system based on spatial light modulator to realize 3D reconstruction of the light field through the optoelectronic computing.

In conclusion, the existing 3D reconstruction method of the light field have the disadvantages of high energy consumption, large demand for computing resources, and difficulty in real-time calculation, which makes it difficult to perform efficient and real-time dynamic 3D reconstruction tasks. Optical computing is a potential method for solving this problem.

The method and the device for intelligent depth classification of a light field based on optoelectronic computing according to embodiments of the disclosure will be described with reference to the accompanying drawings below.

Figure 1:
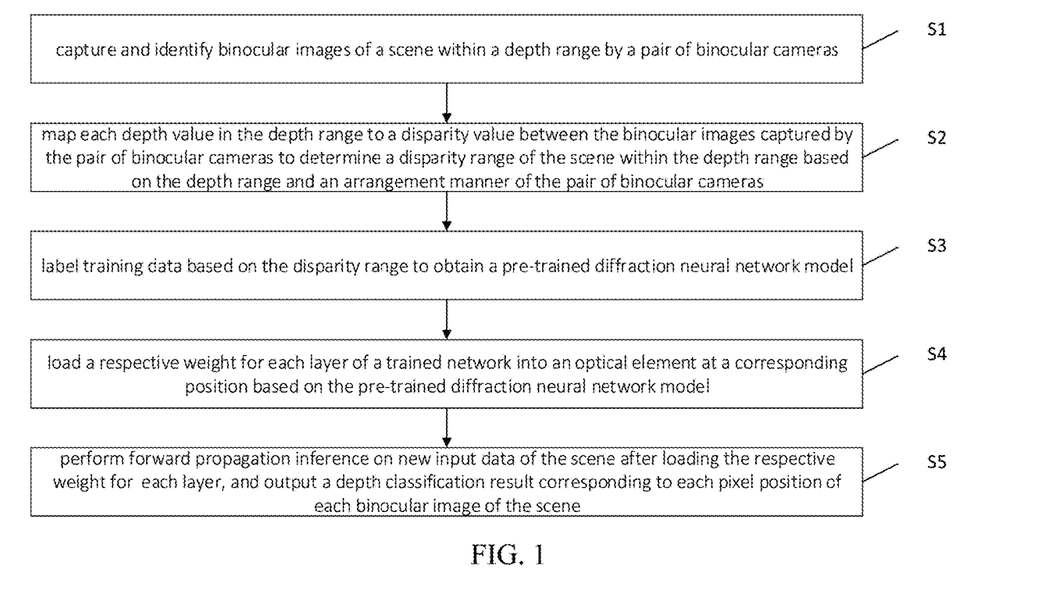
FIG. 1 is a flowchart illustrating a method for intelligent depth classification of a light field based on optoelectronic computing according to some embodiments of the disclosure.
Figure 2:
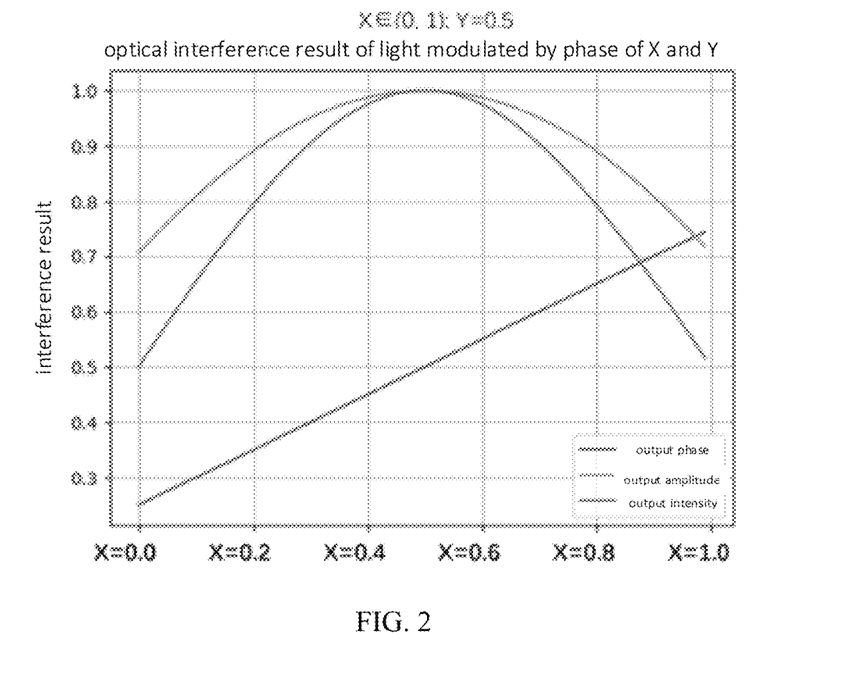
FIG. 2 is a schematic diagram illustrating interference matching effects of different pixel values according to some embodiments of the disclosure.

FIG. 1 is a flowchart illustrating a method for intelligent depth classification of a light field based on optoelectronic computing according to some embodiments of the disclosure.

As illustrated in FIG. 1, the method includes the following.

At block S1, binocular images of a scene within a depth range are captured and identified by a pair of binocular cameras.

In detail, the disclosure can be applied in application scenarios such as robot intelligent obstacle avoidance or automatic driving assistance. By obtaining a respective distance of each object in a scene using the pair of binocular cameras, a reasonable route plan can be made and obstacle avoidance operations can be performed based on the respective distance. In these application scenarios, the depth map in the whole field of view is not desired, but the distribution of objects within a depth range is desired in the disclosure.

At block S2, each depth value in the depth range is mapped to a disparity value between the binocular images obtained by the pair of binocular cameras based on the depth value and an arrangement manner of the pair of binocular cameras, to obtain a disparity range of the scene within the depth range.

It can be understood that, for the above application scenarios, the disclosure can obtain the distribution of objects within a specified depth range based on a selected depth threshold or a certain depth range. The specific implementation is as follows.

First, according to the arrangement manner of the pair of binocular cameras, the depth value can be mapped to the disparity value between the images obtained by the pair of binocular cameras according to the following equation:

$$disparity_i = \frac{F * \text{baseline}}{depth_i * \text{pixel\_size}},$$

where, $disparity_i$ denotes the disparity value between the binocular images at a corresponding depth value $depth_i$, F denotes a focal length of each binocular camera, baseline denotes a length of a baseline between the pair of binocular cameras (i.e., a distance between lenses), and pixel_size denotes a pixel size of an image sensor of each binocular camera. This equation can determine the disparity range of the scene.

At block S3, training data is labeled based on the disparity range to obtain a pre-trained diffraction neural network model.

It can be understood that the training data of the diffraction neural network model can be labeled according to the obtained disparity range. An ideal case is that the output of the optoelectronic diffraction neural network is a serial number of a respective disparity range where an object corresponding to each pixel position in the field of view is located. If an upper disparity limit and a lower disparity limit obtained based on a selected depth range are respectively denoted by disp1 and disp2, the serial number '−1' can be used to indicate that the disparity value of a pixel is higher than the upper disparity limit (i.e., disp1), a serial number '0' can be used to indicate that the disparity value of a pixel is between the upper disparity limit (i.e., disp1) and the lower disparity limit (i.e., disp2), and a serial number '1' can be used to indicate that the disparity value of a pixel is less than the lower disparity limit (i.e., disp2). Thus, labels used for training the diffraction neural network training are −1, 0 or 1, which is a classification problem. During the training, the loss function used can be cross entropy. In a case where objects in the scene are unevenly distributed, weighted cross entropy can be used as the loss function, where corresponding weights are determined by the disparity distribution of objects. The optimizer used can be Adam optimizer whose parameters are default.

At block S4, based on the pre-trained diffraction neural network model, the pretrained weights for each layer is extracted and loaded to the corresponding optical elements (SLMs) in order to perform the optical inferring in the physical system.

It can be understood that, after obtaining the pre-trained diffraction neural network model, the weights of the layers of the network can be loaded onto the corresponding optical elements at the corresponding positions. In practice, spatial light modulators (SLMs) or phase masks are usually used as wavefront modulators in the optoelectronic system. These pre-trained weights correspond to the phase delay distribution of the SLM or the thickness distribution of the phase mask.

Figure 8:
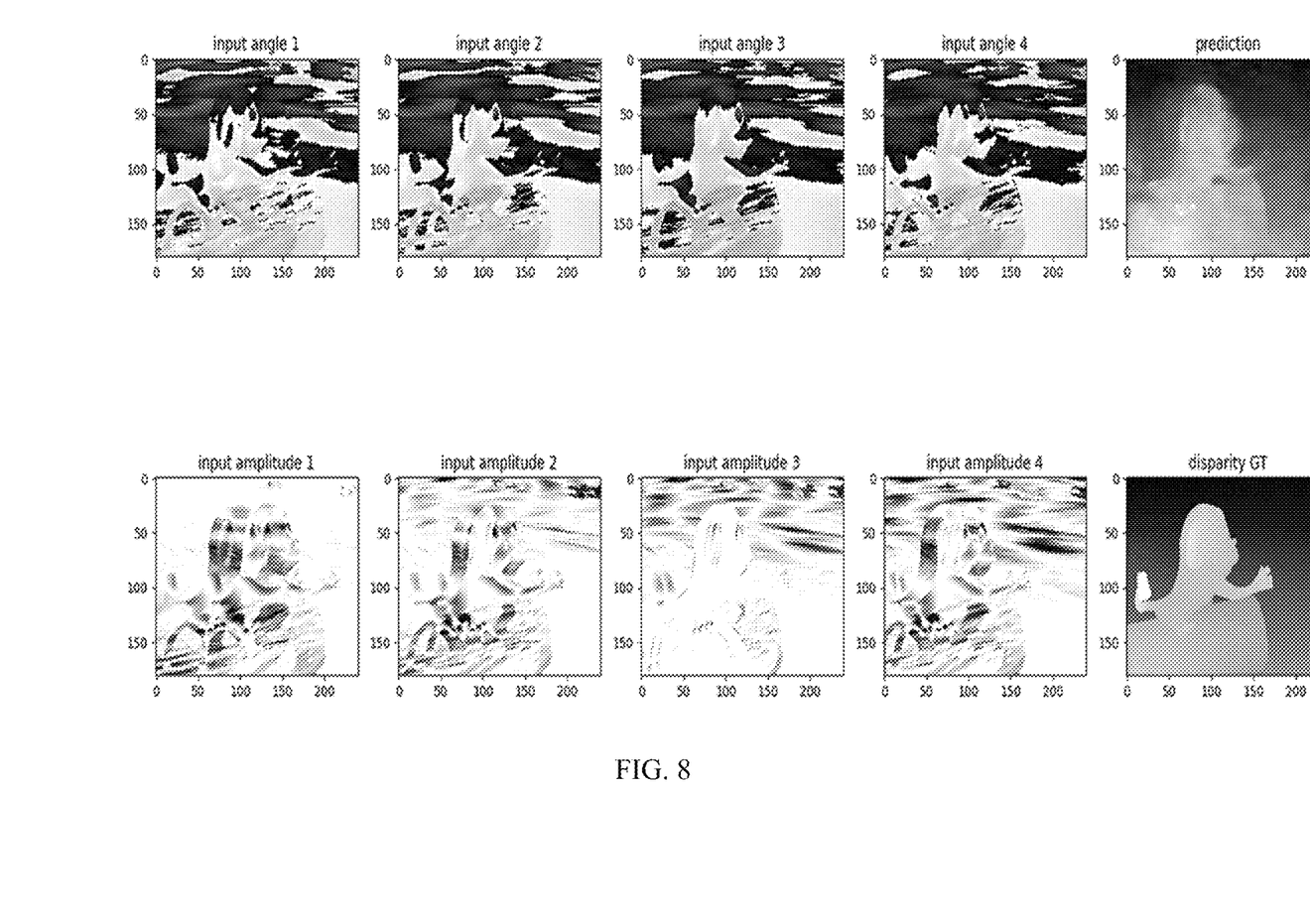
FIG. 8 is a schematic diagram of a depth data output according to some embodiments of the disclosure.

The weights in the neural network are obtained through the training based on other binocular matching datasets in the disclosure. After the neural network has been trained and fully converged, the neural network is tested with new data. As illustrated in FIG. 8, the 4 left columns are 4-channel data as input data. Since the input data is a light field in a form of complex amplitude, the amplitude and the phase are represented respectively. The image in the lower right corner is a standard disparity map of this data, and the image in the upper right corner is the output result of the network. It can be seen the generalization of the network enables the network to deal with the new input data to obtain an accurate disparity map.

At block S5, after the respective weight for each layer of the network is loaded, forward propagation inference is performed on the new input data of the scene, and a depth classification result corresponding to each pixel position in the binocular image of the scene is output.

In detail, after the weights of the diffraction neural network are loaded, the forward propagation inference can be performed on the new input data of the scene, and the final output is the depth classification result of the object corresponding to each pixel position in the scene. If the output value is 1, it indicates that the object corresponding to this position is within a range farther than the depth range. If the output value is 0, it indicates that the object corresponding to this position is within the depth range. If the output value is −1, it indicates that the object corresponding to this position is within a range closer than depth range.

Further, as an extension of the depth classification task, the scene can be divided into denser depth ranges, and the depth ranges are classified using different labels for distinguishing. In this case, there may be more values used as the labels of the diffraction neural network during the pre-training, and more possibilities can be by the final output.

Through the construction of the optical system and the data pre-processing method, the objects at different depths in the scene can be quickly classified, thereby assisting the intelligent system to make further operation judgments.

With the method for intelligent depth classification of a light field based on optoelectronic computing according to embodiment of the disclosure, the binocular images of the scene within the depth range are captured and identified by the pair of binocular cameras; each depth value in the depth range is mapped to the disparity value between the binocular images captured by the pair of binocular cameras based on the depth value and the arrangement manner of the pair of binocular cameras, to obtain the disparity range of the scene within the depth range; the training data is labeled based on the disparity range to obtain the pre-trained diffraction neural network model; the respective weight for each layer of the network obtained through the training is identified and loaded to the corresponding optical element; and after the respective weight for each layer of the network is loaded, the forward propagation inference is performed on the new input data of the scene, and a depth classification result corresponding to each pixel position in the binocular images of the scene is output. Through the optoelectronic interference matching computing module and a freely combinable optoelectronic diffraction computing module, the disclosure can build a complete intelligent depth classification neural network of a light field based on the optoelectronic computing, which reduces energy consumption, improves the computing speed, and achieves the depth classification of the image.

As an implementation, a modularized optoelectronic diffraction neural network is used to fuse multi-channel light field information and perform phase modulation in a frequency domain to complete a single diffraction computing. Further, an interference matching operation is performed based on image features of the binocular images to obtain an interference matching result and multiple interference matching results are fused through the modularized optoelectronic diffraction neural network into a final disparity map.

Figure 5:
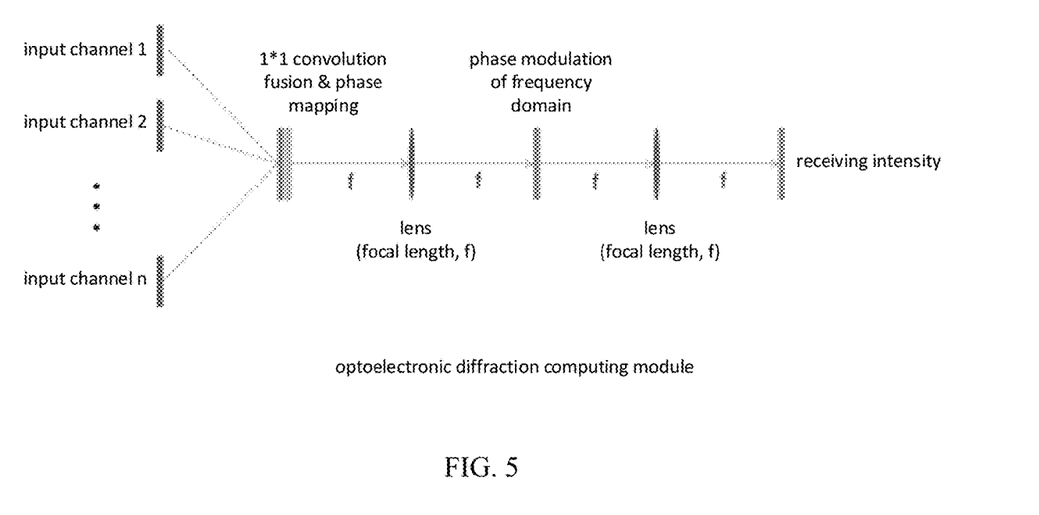
FIG. 5 is a schematic diagram illustrating compositions of a diffraction calculation unit according to some embodiments of the disclosure.

In detail, the diffraction computing module is illustrated in FIG. 5. This diffraction computing module fuses the output multi-channel light field information and performs the phase modulation in the frequency domain to complete the single diffraction computing. As a basic computing module of the diffraction neural network, the diffraction computing module can be flexibly reused to form different network structures for computing tasks of different complexity.

It can be understood that the disclosure uses two horizontally placed identical cameras as the pair of disparity cameras for photographing the scene. The two horizontally placed identical cameras are fixed through a checkerboard calibration plate. The internal parameter matrixes and external parameter matrixes of the pair of binocular cameras are calibrated.

Each image captured by the pair of binocular camera has a resolution of 960*540 pixels. The size of the image is scaled down by 3 times, i.e., the resolution becomes 320*240 pixels. The pair of binocular images are corrected using the aforementioned internal and external parameter matrixes and are expanded to the size of 800*800 pixels via a zero padding method. Expanding the binocular images via the zero padding method is to avoid a problem of spectral leakage caused by lens transformation before and after frequency domain modulation.

Given that the disparity value corresponding to an object in the scene closest to an observation point is 261 pixels, since the image is scaled down by a factor of three, the maximum of the disparity value is in fact 87 pixels. According to a shifting method of the aforementioned multiple interference operations, a total of 4 times of shifting are required, and the respective shifting values are 10, 30, 50, and 70 pixels, thereby ensuring that all captured objects are effectively reflected in the results of the matching operations.

The image data in the real number domain is modulated to the phase of the complex number field according to the aforementioned mapping method, the binocular interference is performed, and the result of the matching computing is received. The above shifting method repeats 4 times to obtain 4 results including all matched information.

Figure 6:
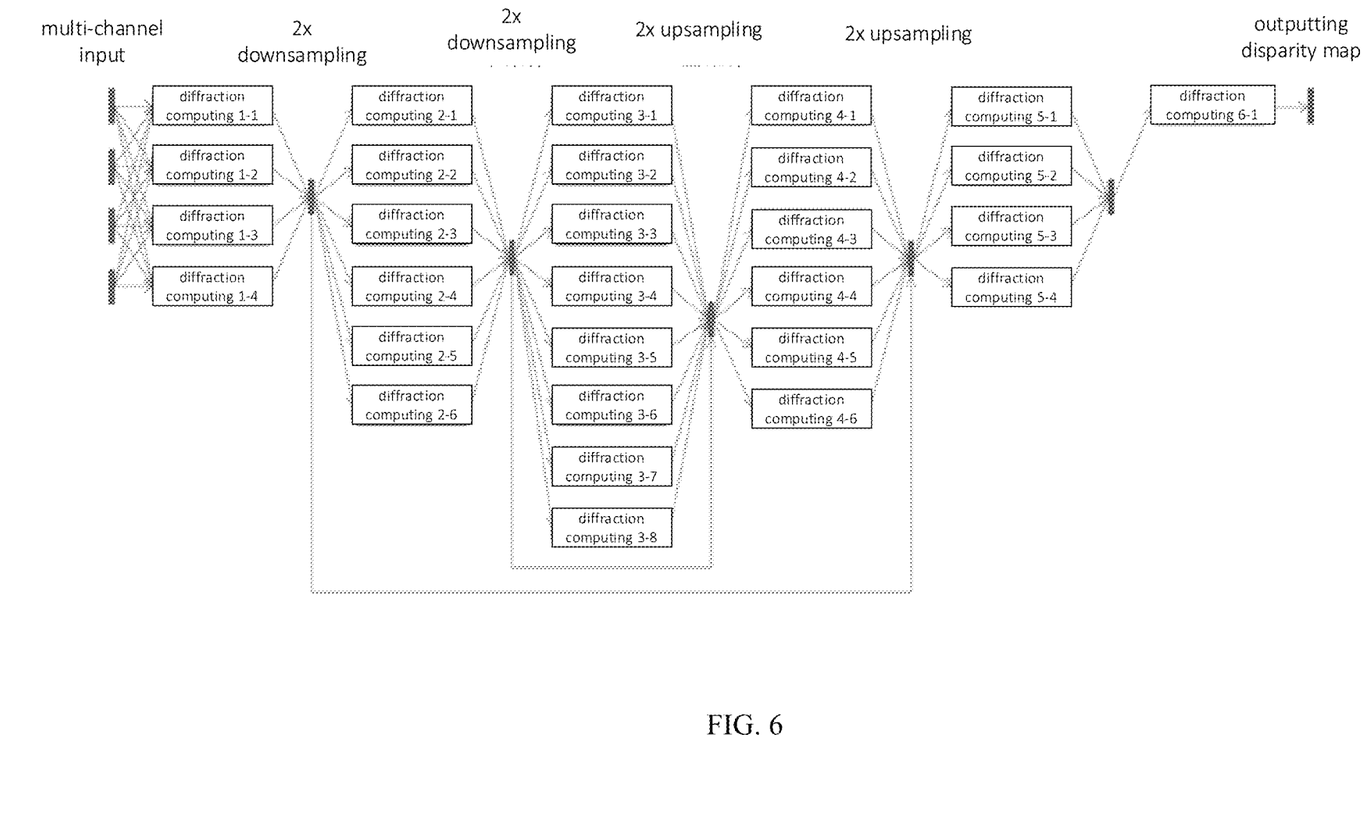
FIG. 6 is a structural diagram illustrating an optoelectronic computing network of disparity fusion including diffraction computing modules according to some embodiments of the disclosure.

Further, as illustrated in FIG. 6, a diffraction network structure used for disparity classification computing is provided, which includes a skip connection structure, to ensure that the gradient can normally return updated parameters under large network scale.

A modularized diffraction neural network for disparity fusion computing depending on the scene complexity is built. In this example, the disparity fusion computing realized by the network is as follows. Inputs of 4 channels are input respectively into four diffraction calculation modules with a common weight, to obtain a four-channel output. The four-channel output is down sampled by 2*2, such that the size of the four-channel output becomes 400*400 pixels, and the zero-padding is performed to obtain a next-layer input having the size of 800*800 pixels (this operation is for multi-scale computing to improve generalization). The processed four-channel output is input into 6 diffraction computing modules with independent weights to obtain outputs of six channels, and a respective central area having the size of 400*400 pixels is extracted from the output of each channel to obtain a final result of this layer, i.e., a 6-channel output. The output of this layer is reduced to a resolution of 200*200 pixels with a similar down sampling method, and the zero-padding is performed to obtain a next-layer input having the size of 800*800 pixels. Further, the processed six-channel output is input into 8 diffraction computing modules with independent weights to obtain outputs of 8 channels, and a respective central area having the size of 200*200 pixels is extracted from the output of each channel to obtain a final output, i.e., a 8-channel output.

The zero-padding is performed on the 8-channel output to increase the size to 800*800 pixels and the processed 8-channel output is input into 6 diffraction computing modules with independent weights in the next layer to obtain outputs of 6 channels. A respective central area having the size of 200*200 pixels is extracted from the output of each channel to obtain a final output of this layer, i.e., a new 6-channel output. Using the bilinear interpolation, the new 6-channel input is up sampled to a size of 400*400 pixels. This newly processed 6-channel data will be concatenate with the aforementioned processed six-channel output data to form the new 12-channel data as the input of the next layer. This 12-channel data is input to 4 diffraction computing modules with independent weights and central areas each having the size of 400*400 pixels are extracted, such that a 4-channel output of this layer is obtained. With the same bilinear interpolation, the resolution becomes 800*800 pixels. This 4-channel data is combined with the aforementioned processed 4-channel output to form an 8-channel data. This 8-channel data is input to one diffraction computing module to obtain a final output, i.e., single-channel data. This final output is the disparity fusion result of the scene, which is the final disparity map.

As an implementation, the number of times of interference matching and the value of interference shifting are selected based on the image features, and optical interference processing is performed on two inputs corresponding to different viewpoints based on the selected interference shifting through an optical interference matching computing module to obtain the matching computing result.

Figure 3:
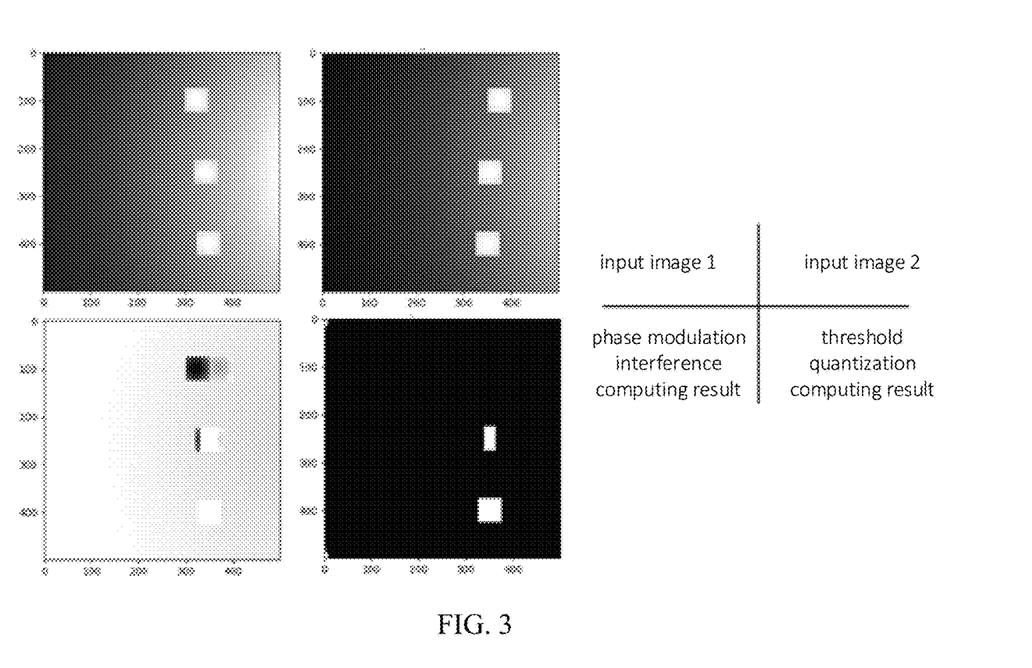
FIG. 3 is a schematic diagram illustrating interference matching and quantization results of a simple scene according to some embodiments of the disclosure.

In detail, the number n of times of interference matching and the interference shifting $SV_i$ are selected based on the image features. During the interference matching operation, the disparity range that can be processed by each time of interference is 20 pixels (i.e., for most scenes of 3D reconstruction, each interference can ensure the reliability of the disparity matching within the range of +/−10 pixels). As illustrated in FIG. 3, there are three bright spots in the scene, and a pair of horizontally placed binocular cameras are used to capture images. The left and right images are illustrated on the first row of FIG. 3. Since the bright spots are at different distances from the observation point, positions of the bright spots in the left and right images are different. The disparity between the positions represents a corresponding distance. For the bright spots with a moderate disparity value (e.g., the middle and lower bright spots), a difference can be observed in the matching result, but for the bright spot with an excessive disparity value (e.g., the upper bright spot closer to the observation point), the interference matching result cannot reflect its disparity value and is drowned in background noise. Through many practices, 20 pixels can be used as an effective disparity threshold. For an object whose disparity value exceeds this effective disparity value, one of the binocular images can be translated in the horizontal direction to manually adjust the larger or smaller disparity value of the object to a disparity value that the system can process.

In the disclosure, the disparity value of the object closest to the observation point in the scene is defined as a maximum disparity value of the scene, and the number of translations required can be determined based on the maximum disparity value. If the maximum disparity value is Dmax, the total number of translations required is [Dmax/20], and the translation value of each translation is 10+20*i, where i is the serial number of each translation. For example, if the maximum disparity value of the scene is 86, a total of 4 translations and interferences are required, and the translation value is 10, 30, 50, and 70 pixels respectively.

The value of 20 pixels is not limited, which can be flexibly adjusted according to different scenes.

Figure 7:
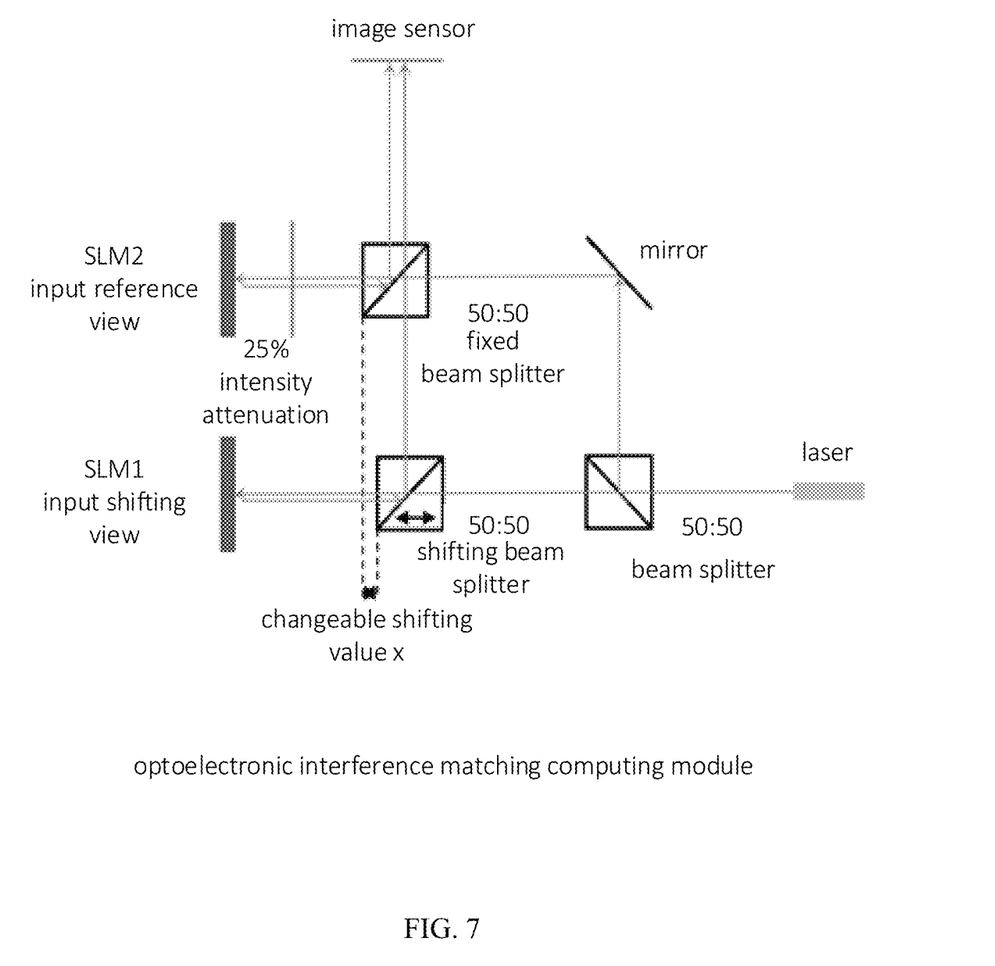
FIG. 7 is a schematic diagram illustrating an optoelectronic interference matching computing module according to some embodiments of the disclosure.

Further, another basic optical module of the disclosure is illustrated in FIG. 7. This interference matching computing module can perform optical interference processing on the two inputs corresponding different viewpoints based on the selected shifting value to obtain the matching computing result.

As an implementation, the light is input into a position corresponding to a reference viewpoint (also referred to a fixed reference viewpoint) and a position corresponding to a shifting viewpoint (for example, a horizontal shifting viewpoint). Both images are encoded to the phase domain of the light fields by setting the SLMs working in phase modulation manner. The interference patterns from the viewpoints are obtained based on a Fresnel near-field diffraction during the propagation of the reflected light fields of the SLMs and captured on the sensor plane of the camera. The absolute shifting distance of the data corresponding to the shifting viewpoints are obtained by multiplying the shifting pixel numbers by the pixel size.

In other words, input data corresponding to the fixed reference viewpoint is displayed on a spatial light modulator (SLM) which is working in a phase modulation manner. Another SLM with the same modulation manner is encoding the shifting viewpoint which will shifting left-and-right with a certain series of distances. The reflected light fields from the both SLMs will interfered on the sensor plane of the camera. Multiple interference patterns are obtained according to these shifting values of the image of the shifting viewpoint.

In detail, as illustrated in FIG. 7, the light corresponding to the fixed reference viewpoint (i.e., the viewpoint without shifting) is input to the position of SLM2 in the phase modulation manner. The light corresponding to the shifting viewpoint is input to the position of SLM1 in the same phase modulation manner. Since it desires that the interference occurs on the plane where the image sensor is located, the phase distributions of these two SLMs are determined based on the Fresnel near-field diffraction model and the optical path lengths of these two SLMs with respect to the image sensor, thereby ensuring that the desired optical field distribution is obtained on the plane where the image sensor is located. The shifting value of the data of the shifting viewpoint is obtained by multiplying the shifting pixel value by the pixel size of a single pixel and is used as a shifting value x of a shifting beam splitter. This shifting value x can be controlled by an electronically controlled shifting stage.

As an implementation, the laser light emitted by a laser is divided into two beams by a first beam splitter, and used as coherent light of the fixed reference viewpoint and the shifting viewpoint. The modulated light of the fixed reference viewpoint and the modulated light of the shifting viewpoint pass through a fixed beam splitter and a shifting beam splitter respectively, and are interfered with each other on the plane where the image sensor is located. The intensity distribution after the interference is recorded to obtain the result of the interference matching computing.

In detail, as illustrated in FIG. 7, the laser beam emitted from the laser is divided by the first beam splitter shown on the right in FIG. 7, into two beams, and the two beams are used as coherent light sources to illuminate two SLMs respectively. The light fields modulated by the two SLMs pass through the fixed beam splitter and the shifting beam splitter as illustrated in FIG. 7, and are interfered on the plane where the image sensor is located. The intensity distribution after the interference is recorded as the result of the interference matching computing. In order to ensure the consistency of the intensity values of the two paths during the interference, a 25% light attenuator can be placed at the optical upstream of the SLM2.

With different shifting values x, the two inputs can be interfered multiple times, and a corresponding result can be obtained. This result can be further input into the diffraction computing module to complete the subsequent computing of depth classification.

As an implementation, the optoelectronic diffraction neural network modulates specific information onto the wavefront based on the diffraction properties of the light field as it propagates in free space to complete the computing. The propagation of the light field in free space can be modeled based on a Fresnel diffraction equation or angular spectrum propagation theory.

As an implementation, an angular spectrum distribution on a target plane is obtained based on an angular spectrum and a propagation distance of the light field on the plane. The angular spectrum distribution is inversely transformed in the frequency domain to obtain a complex amplitude distribution of the target plane. On the target plane, a phase mask or a spatial light modulator matching the frequency of the light field is used to modulate the complex amplitude distribution of the light field. The modulated light field reaches the receiving plane through the same propagation. The receiving plane performs intensity sampling on the complex amplitude distribution of the light field to obtain a result of the optoelectronic diffraction computing. The nonlinear processing is performed on the result of the optoelectronic diffraction computing as an input distribution of a next diffraction computing or as an output result of the neural network.

In detail, the optoelectronic diffraction neural network according to the disclosure is a novel computing architecture with high throughput and low energy consumption, which modulates specific information for the wavefront to complete the required computation based on the diffraction characteristics of the light field when it propagates in the free space. The propagation of light field in the free space can be modeled by the Fresnel diffraction equation (near-field diffraction approximation) or by the angular spectrum propagation theory. Taking the angular spectrum theory as an example, $U(x,y)$ and $U_o(x,y)$ denote the light field distribution of an initial plane and the light field distribution of a plane at a distance of z from the initial plane, and $$A\left(\frac{\cos(\alpha)}{\lambda}, \frac{\cos(\beta)}{\lambda}\right)$$

and $$A_o\left(\frac{\cos(\alpha)}{\lambda}, \frac{\cos(\beta)}{\lambda}\right)$$

denote corresponding angular spectrum respectively, $$\frac{\cos(\alpha)}{\lambda}, \frac{\cos(\beta)}{\lambda}$$

denote spatial frequency $f_x$ and $f_y$, and a following equation is satisfied:

$$U(x, y) = \int\!\!\!\int_{-\infty}^{+\infty} A\left(\frac{\cos(\alpha)}{\lambda}, \frac{\cos(\beta)}{\lambda}\right)\exp\left[j2\pi\left(\frac{\cos(\alpha)}{\lambda}x + \frac{\cos(\beta)}{\lambda}y\right)\right]d\left(\frac{\cos(\alpha)}{\lambda}\right)d\left(\frac{\cos(\beta)}{\lambda}\right).$$

According to a scalar wave equation, there is:

$$A_o\left(\frac{\cos(\alpha)}{\lambda}, \frac{\cos(\beta)}{\lambda}\right) = A\left(\frac{\cos(\alpha)}{\lambda}, \frac{\cos(\beta)}{\lambda}\right)\exp\left(jkz\sqrt{1-\cos^2\alpha - \cos^2\beta}\right).$$

The above equation shows that the angular spectrum distribution on the target plane can be obtained based on the angular spectrum of the light field on the z=0 plane and the propagation distance z. The angular spectrum distribution is inversely transformed in the frequency domain to obtain the complex amplitude distribution of the target plane. On this target plane, a phase mask or a spatial light modulator (SLM) that matches the frequency of the light field can be used to modulate the complex amplitude distribution of the light field, where the information to be modulated represents that to be computed in the disclosure. This step is the core step of the optoelectronic diffraction computing. The modulated light field reaches the receiving plane through the same propagation. On the receiving plane, photodiode arrays or commonly used CCD, CMOS devices can be used to perform the intensity sampling on the complex amplitude distribution of the light field. This sampling result records the result of the optoelectronic diffraction computing. After the nonlinear processing, the result can be used as the input distribution of the next diffraction computing (the middle layers of the diffraction neural network) or as the final output result of the neural network.

As an implementation, a medium with thickness distribution is placed in the optical path to perform frequency domain transformation on the input light field, and another medium with thickness distribution is used to perform the inverse frequency domain transformation on the modulated light field.

Further, in the disclosure, by placing the medium with thickness distribution, such as a lens, in the optical path, the domain transformation operation can be performed for the distribution of the input light field. In the disclosure, a convex lens can be used to perform the frequency domain transformation on the input light field, and a same convex lens can be used to perform the inverse frequency domain transformation on the modulated light field. The convex lens has a focal length, f, and is placed on a plane at z=f. An input plane is placed at z=0. The phase modulation is located at z=2f. The optical centers of the above three optical elements are on the same line, and their normal lines are parallel to this line. Therefore, a standard 2f optical path setting is built. In this setting, the light field distribution of the modulation plane and the light field distribution of the input plane satisfy the frequency domain transformation relationship according to the thickness distribution of the thin lens, i.e., $$U_{z=2f}(\xi, \eta) \propto \int\int_{-\infty}^{+\infty} U_{z=0}(x, y)\exp[-j2\pi(x\xi + y\eta)]dxdy,$$

where, $$\xi = \frac{x}{\lambda f}, \eta = \frac{y}{\lambda f}$$

is the spatial frequency.

Through such a 2f system, the frequency domain modulation computing of the input light field is realized. After the computing, the same 2f system is used to convert the frequency domain to the spatial domain, and the computing result is received. Compared with an existing spatial domain modulation, the frequency domain computing has higher modulation efficiency, which further improves the fitting characteristics of the optoelectronic diffraction neural network. This 4f system is adapted to form the basic optoelectronic diffraction computing module, which uses a reflective spatial light modulator to perform pure phase modulation with spatial distribution during the frequency domain modulation, and uses the nonlinear characteristics of image sensor on the receiving plane as a nonlinear activation. These modules are cascaded to form a complete neural network structure.

For the aforementioned neural network structure, traditional electronic computing methods for the neural network is used for training. The basic diffraction computing module is modeled using the aforementioned angular spectrum diffraction theory, to process the input data in the electronic computing and obtain the intermediate result of the simulation. The Tensorflow 2.4 computing platform is used in the training, and the diffraction module is modeled as a layer of the neural network. The trainable parameters for each layer are the phase modulation parameters (i.e., the phase delay degree with spatial distribution) during the frequency domain modulation. During the training, the structural similarity index measurement (SSIM) and the mean squared error (MSE) are used as the loss function for optimizing the training, and the ADAM optimizer with a factor of 0.0005 is used. The output is obtained by performing the computing based on the input data through the neural network. A loss function value between this output and the standard output (ground truth) is obtained. The parameters in the network are derived based on the loss function. The parameters are iteratively updated based on the value of the derivative function. As a result, the final network parameters tend to be convergent to finish the training.

After the training is finished, the training results (i.e., the phase delay parameters of each diffraction computing module after joint optimization) map to actual parameters in a physical system, and the parameters are written into the corresponding spatial light modulators in sequence. At this time, the input data is input into the optoelectronic system, and the final 3D reconstruction result (in the form of depth map) can be quickly obtained on the output plane.

Figure 4:
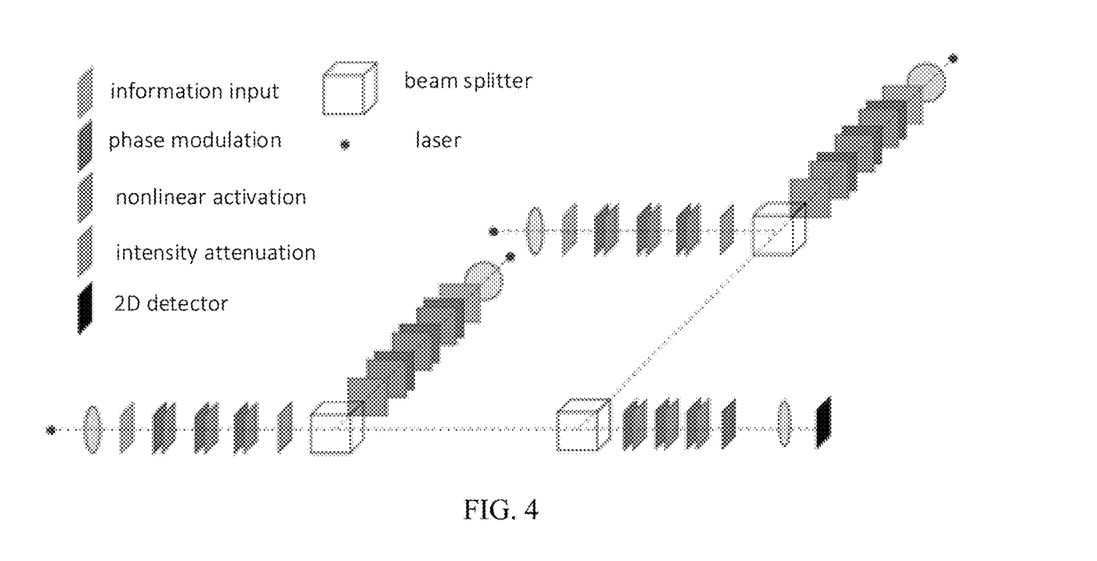
FIG. 4 is an exemplary diagram illustrating an optical path arrangement of a modularized optical diffraction neural network according to some embodiments of the disclosure.

As illustrated in FIG. 4, a 1*1*channels kernel is applied in each diffraction neural network module to fuse the multi-channel input data. This 1*1 convolution is used to obtain a weighted summation of different inputs. The parameters in this convolution kernel is trainable. The fused result is transformed into a frequency domain representation through the 2f lens transformation system. After a pure phase modulation, the phase delay value is a trainable parameter. The phase delay value further passes through another 2f lens transformation system and is transformed into the spatial domain. An image sensor is used to receive the intensity of this complex field. The intensity is the input of a next layer.

In each module, the optoelectronic diffraction neural network performs a complete 4f frequency domain modulation on the input data. By connecting multiple modules in parallel or in series, a more complex optoelectronic diffraction neural network can be formed, which performs fitting for a scene with a more complex distribution and accurately map the results of the aforementioned interference matching computing to the disparity map. Due to the characteristics of optoelectronic computing, all computing in this fusion operation is achieved by optical computing, without huge GPU or CPU resources.

This modularized optoelectronic diffraction neural network has three features. One is to fuse multiple inputs into one through a 1*1 single-channel convolution. Thus, the conventional linear optoelectronic network structure is provided with the possibility of multiple logic channels. In applications of convolutional neural network, the network performance is improved by the multi-channel operations. Further, the modularized diffraction network according to the disclosure has a fitting advantage compared with the traditional linear network in regression computing. The second one is that each network module uses pure phase modulation input and receives the intensity result. In the process of connecting two modules, this intensity-to-phase mapping provides a strong nonlinear feature, which improves the generalization of the network. The third one is that no spatial modulation is used in the entire optoelectronic network according to the disclosure. For the disparity aggregation computing task, it is required that the network has translation invariance, that is, for the same pattern at different positions, the same output result can be obtained at a corresponding position on the output end. The frequency domain modulation performed using the 4f system is equivalent to the convolution in the spatial domain, which has the translation invariance, and the single-channel convolution kernel used in multiplex fusion also has this property of translation invariance. However, the spatial modulation does not have this property. The generalization will be reduced if the spatial modulation is used. Therefore, in the disclosure, all the modulation computing is performed on the frequency domain plane instead of the spatial modulation layer which performs batter on the classification task of the optoelectronic diffraction network.

Therefore, the optoelectronic diffraction neural network according to the disclosure has the following characteristics. The network structure is flexible and changeable. Since the modularized diffraction computing unit is used, the network scale and module position allocation can be flexibly changed based on factors such as the disparity distribution of the scene. Therefore, the network with a reasonable scale and structure can be used for the disparity computing. In addition, the network has the characteristic of multi-scale feature computing. In the middle layers, multiple up sampling and down sampling are performed to obtain feature information of different scales, which can take both the small-scale details and the large-scale macrostructures into account. Furthermore, the network has the characteristic of skip connection of the output results. This third characteristic, together with the second characteristic, ensures the generalization of the neural network, such that the training results (network weights) can be applied to a new task scenario.

Figure 9:
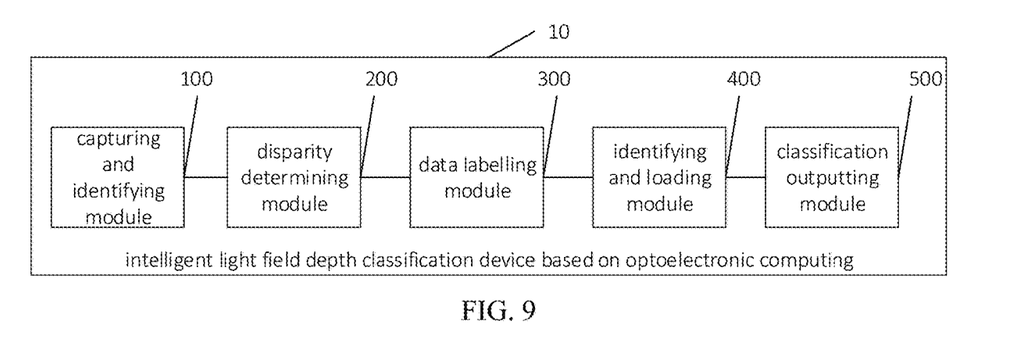
FIG. 9 is a schematic block diagram illustrating a device for intelligent depth classification of a light field for optoelectronic computing according to some embodiment of the disclosure.

FIG. 9 is a schematic block diagram illustrating a device for intelligent depth classification of a light field based on optoelectronic computing according to embodiments of the disclosure.

As illustrated in FIG. 9, the device 10 includes a capturing and identifying module 100, a disparity determining module 200, a data labeling module 300, an identifying and loading module 400, and a classification outputting module 500.

The capturing and identifying module 100 is configured to capture and identify binocular images of a scene within a depth range by a pair of binocular cameras.

The disparity determining module 200 is configured to map each depth value in the depth range to a disparity value of each binocular image captured by the pair of binocular cameras based on the depth value and an arrangement of the binocular cameras, to determine a disparity range of the scene within the depth range.

The data labeling module 300 is configured to label training data based on the disparity range to obtain a pre-trained diffraction neural network model.

The identifying and loading module 400 is configured to load a respective weight for each layer of the network after the training into a corresponding optical element based on the pre-trained diffraction neural network model.

The classification outputting module 500 is configured to perform forward propagation inference on new input data of the scene after the respective weight for each layer of the network is loaded, and output a depth classification result corresponding to each pixel position of each binocular image in the scene.

With the device for intelligent depth classification of a light field based on optoelectronic computing according to embodiments of the disclosure, the capturing and identifying module is configured to capture and identify binocular images of a scene within a depth range by a pair of binocular cameras. The disparity determining module is configured to map each depth value in the depth range to a disparity value of each binocular image captured by the pair of binocular cameras based on the depth value and an arrangement of the binocular cameras, to determine a disparity range of the scene within the depth range. The data labeling module is configured to label training data based on the disparity range to obtain a pre-trained diffraction neural network model. The identifying and loading module 400 is configured to identify and load a respective weight for each layer of the network after the training into a corresponding optical element based on the pre-trained diffraction neural network model. The classification outputting module is configured to perform forward propagation inference on new input data of the scene after the respective weight for each layer of the network is loaded, and output a depth classification result corresponding to each pixel position of each binocular image in the scene. Through the optoelectronic interference matching computing module and the freely combinable optoelectronic diffraction computing module, a complete intelligent depth classification neural network of the light field based on the optoelectronic computing can be built, the energy consumption is reduced and the speed is increased, to achieve the depth classification of the image.

In conclusion, the information processing process has been verified by multiple data sets, showing high robustness, stability, and accuracy. Further, the flexible and variable network structure provides high adaptability of the network.

It should be noted that, the foregoing explanations on embodiments of the intelligent depth classification method of the light field based on optoelectronic computing are also applicable to the aforementioned device, which is not repeated here.

In addition, the terms "first" and "second" are only used for descriptive purposes, and should not be construed as indicating or implying relative importance or implying the number of indicated technical features. Thus, a feature delimited with "first", "second" may expressly or implicitly include at least one that feature. In the description of the disclosure, the term "plurality" means at least two, such as two, three, etc., unless otherwise expressly and specifically defined.

In the description of this specification, description with reference to the terms "one embodiment," "some embodiments," "example," "specific example," or "some examples", etc., mean specific features described in connection with the embodiment or example, structure, material, or feature is included in at least one embodiment or example of the disclosure. In this specification, schematic representations of the above terms are not necessarily directed to the same embodiment or example. Furthermore, the features, structures, materials, or characteristics described may be combined in any suitable manner in any one or more embodiments or examples. Furthermore, those skilled in the art may combine and combine the different embodiments or examples described in this specification, as well as the features of the different embodiments or examples, without conflicting each other.

Although the embodiments of the disclosure have been shown and described above, it is to be understood the above embodiments are exemplary and should not be construed as limiting the disclosure. Embodiments are subject to variations, modifications, substitutions, and variations.

What is claimed is:

1. A method for intelligent light field depth classification based on optoelectronic computing, comprising:
    capturing and identifying binocular images of a scene within a depth range through a pair of binocular cameras;
    mapping each depth value in the depth range to a disparity value between the binocular images based on the depth value and an arrangement manner of the pair of binocular cameras, to obtain a disparity range of the scene within the depth range;
    labeling training data based on the disparity range to obtain a pre-trained diffraction neural network model;
    loading a respective weight for each layer of a network obtained after training into a corresponding optical element based on the pre-trained diffraction neural network model; and
    after the respective weight for each layer of the network is loaded, performing forward propagation inference on new input data of the scene, and outputting a depth classification result corresponding to each pixel in the binocular images of the scene;
    wherein labeling training data based on the disparity range comprises: determining that an ideal output of an optoelectronic diffraction neural network is a serial number of a respective disparity range where an object corresponding to each pixel position in a field of view is located, and obtaining an upper disparity limit and a lower disparity limit based on a selected depth range, wherein the serial number being −1 indicates that the disparity value of a current pixel is higher than the upper disparity limit, the serial number being 0 indicates that the disparity value of the current pixel is between the upper disparity limit and the lower disparity limit, and the serial number being 1 indicates that the disparity value of the current pixel is lower than the lower disparity limit.

2. The method of claim 1, wherein mapping each depth value in the depth range to the disparity value is according to a following equation:

$$disparity_i = \frac{F * baseline}{depth_i * pixel\_size}$$

where, $disparity_i$ denotes the disparity value between the binocular images at a corresponding depth value $depth_i$, F denotes a focal length of each binocular camera, baseline denotes a length of a baseline between the pair of binocular cameras, and pixel_size denotes a pixel size of an image sensor of the binocular camera.

3. The method of claim 2, further comprising:
    fusing output multi-channel light field information by a modularized optoelectronic diffraction neural network, and performing phase modulation in frequency domain to finish a single diffraction operation; and
    performing an interference matching operation based on image features of the binocular images to obtain an interference matching result, and fusing multiple interference matching results as a final disparity map by the modularized optoelectronic diffraction neural network.

4. The method of claim 3, further comprising:
    selecting the number of times of interference matching and a value of interference shifting based on the image features, and obtaining a matching computing result by performing optical interference processing on two inputs corresponding to different viewpoints based on the selected value of interference shifting through an optoelectronic interference matching computing module.

5. The method of claim 4, wherein obtaining the matching computing result comprises:
    inputting data corresponding to a reference viewpoint to a position where a second spatial light modulator (SLM) is located in a phase modulation manner and inputting data corresponding to a shifting viewpoint to a position where a first SLM is located in the phase modulation manner;
    and determining phase distributions of the second SLM and the first SLM based on a Fresnel near-field diffraction model, an optical path length corresponding to the second SLM with respect to the image sensor, and an optical path length corresponding to the first SLM with respect to the image sensor, where a shifting value of the data corresponding to the shifting viewpoint is obtained by multiplying shifting pixel value by a pixel size.

6. The method of claim 5, wherein obtaining the matching computing result comprises:
    dividing, by a first beam splitter, a laser beam emitted by a laser into two beams as coherent light of the reference viewpoint and the shifting viewpoint, and obtaining the interference matching computing result by recording an intensity distribution after light corresponding to the reference viewpoint and light corresponding to the shifting viewpoint pass through a fixed beam splitter and a shifting beam splitter respectively and are interfered with each other on a place where the image sensor is located.

7. The method of claim 3, wherein the optoelectronic diffraction neural network modulates information for a wavefront to finish required computing based on diffraction characteristics of the light field propagating in free space; wherein propagation of the light field in the free space is modeled based on Fresnel diffraction equation or angular spectrum propagation theory.

8. The method of claim 7, wherein modeling the propagation of the light field in free space based on the angular spectrum propagation theory comprises:
    obtaining an angular spectrum distribution on a target plane based on angular spectrum on a plane and a propagation distance of the light field, and obtaining a complex amplitude distribution of the target plane by performing inverse frequency domain transformation on the angular spectrum distribution; and
    modulating the complex amplitude distribution of the light field on the target plane using a phase mask or a spatial light modulator matching frequency of the light field; obtaining a result of optoelectronic diffraction computing by performing intensity sampling on the complex amplitude distribution of the light field on a receiving plane after modulated light field reaches the receiving plane through the same propagation; and performing nonlinear processing on the result of the optoelectronic diffraction computing as an input distribution of a next diffraction computing or as an output result of the neural network.

9. The method of claim 8, further comprising:

placing a medium with thickness distribution medium on an optical path to perform frequency domain transformation on the light field, and performing inverse frequency domain transformation on the modulated light field using the medium with thickness distribution.

10. A device for intelligent light field depth classification based on optoelectronic computing, comprising a processor configured to:

capture and identify binocular images of a scene within a depth range with a pair of binocular cameras;

map each depth value in the depth range to a disparity value between the binocular images based on the depth value and an arrangement manner of the pair of binocular cameras, to obtain a disparity range of the scene within the depth range;

label training data based on the disparity range to obtain a pre-trained diffraction neural network model;

load a respective weight for each layer of a network obtained after training into a corresponding optical element based on the pre-trained diffraction neural network model; and after the respective weight for each layer of the network is loaded, perform forward propagation inference on new input data of the scene, and output a depth classification result corresponding to each pixel in the binocular images of the scene;

wherein the processor is further configured to determine that an ideal output of an optoelectronic diffraction neural network is a serial number of a respective disparity range where an object corresponding to each pixel position in a field of view is located, and obtain an upper disparity limit and a lower disparity limit based on a selected depth range, wherein the serial number being −1 indicates that the disparity value of a current pixel is higher than the upper disparity limit, the serial number being 0 indicates that the disparity value of the current pixel is between the upper disparity limit and the lower disparity limit, and the serial number being 1 indicates that the disparity value of the current pixel is lower than the lower disparity limit.

* * * * *